United States Patent

[11] 3,532,173

| [72] | Inventors | Edwin A. Johnson;<br>Mark C. Rubin, c/o E. & M. Welding Co.<br>Rte. #3, Colfax, Washington 99111 |
|---|---|---|
| [21] | Appl. No. | 666,878 |
| [22] | Filed | Sept. 11, 1967 |
| [45] | Patented | Oct. 6, 1970 |

[54] COMBINATION MOBILE HITCH AND HAULER UNIT FOR ROD WEEDERS
6 Claims, 10 Drawing Figs.

[52] U.S. Cl. .................................................... 172/471,
172/44, 172/674, 172/313, 280/411

[51] Int. Cl. ............................................. A01b 63/00,
A01b 39/19, B62d 53/00

[50] Field of Search ........................................ 172/44, 47,
76, 40, 468, 469, 677, 313, 776, 669, 248, 490;
280/411, 411.1, 411.2, 412

[56] References Cited
UNITED STATES PATENTS

| 1,963,426 | 6/1934 | Taylor | 172/669 |
| 2,349,997 | 5/1944 | Stranlund | 280/411 |
| 2,470,242 | 5/1949 | Felsing | 172/490X |
| 2,966,219 | 12/1960 | French | 280/411X |
| 3,003,789 | 10/1961 | Calkins | 280/411 |
| 3,288,480 | 11/1966 | Calkins et al. | 280/411(UX) |

*Primary Examiner*—Robert E. Pulfrey
*Assistant Examiner*—Stephen C. Pellegrino
*Attorney*—Wells and St. John ABSTRACT: A combination mobile hitch and hauler unit 10 has several rod weeders 11 mounted thereto through individual draw bar frames 66 that are pivotable for upward swinging movement over center to lift the front end of the rod weeders 11 onto the unit 10 when it is desired to transport the rod weeders through a gate or down a highway. The unit 10 has caster wheels that may be turned to enable the unit with the front ends of the rod weeders thereon to move sideways to present a narrow mobile unit.

INVENTORS.
EDWIN A. JOHNSON
MARK C. RUBIN
BY Wells & St John
ATTYS.

INVENTORS.
EDWIN A. JOHNSON
MARK C. RUBIN

ATTYS.

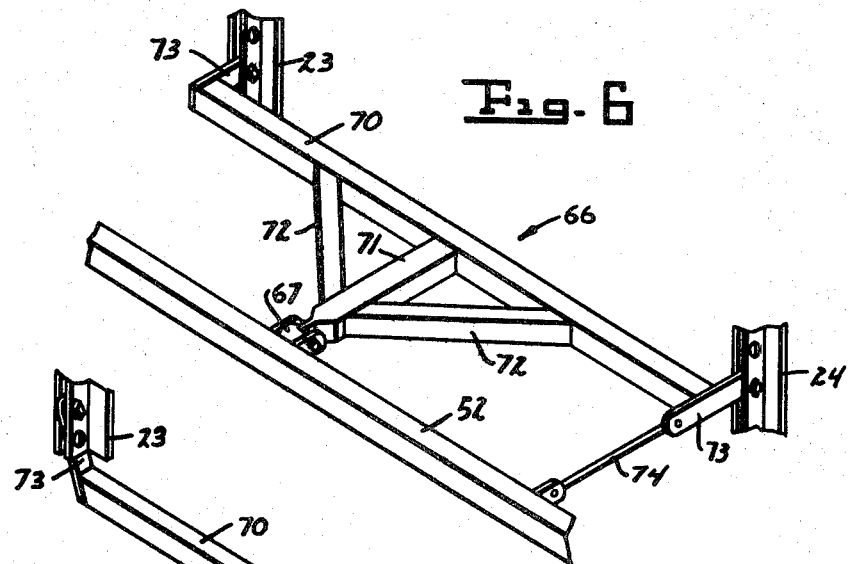
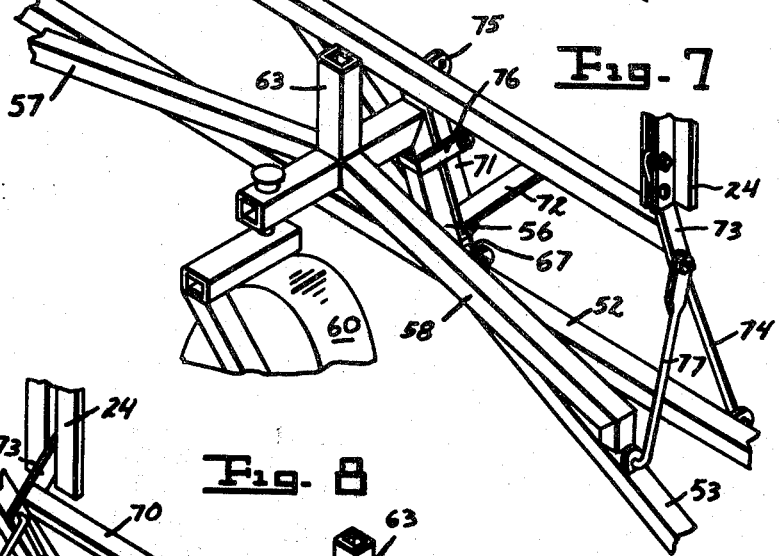
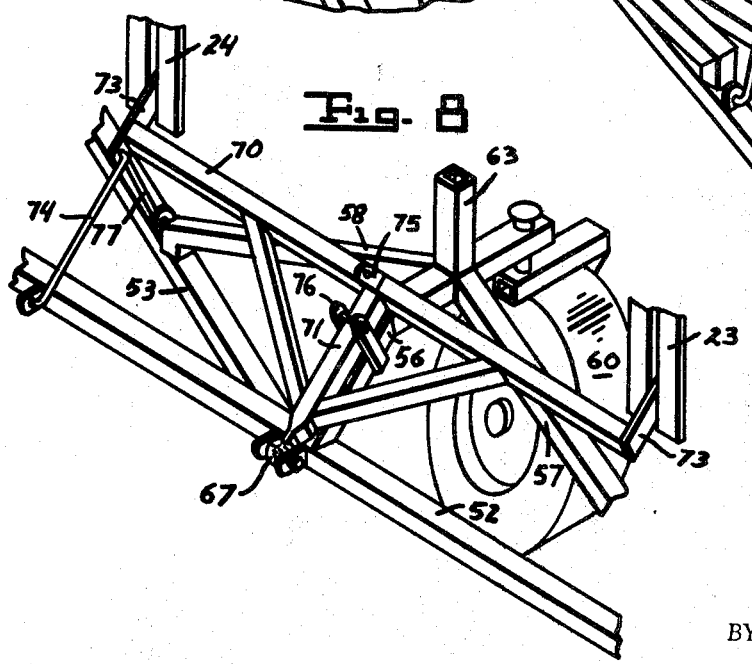

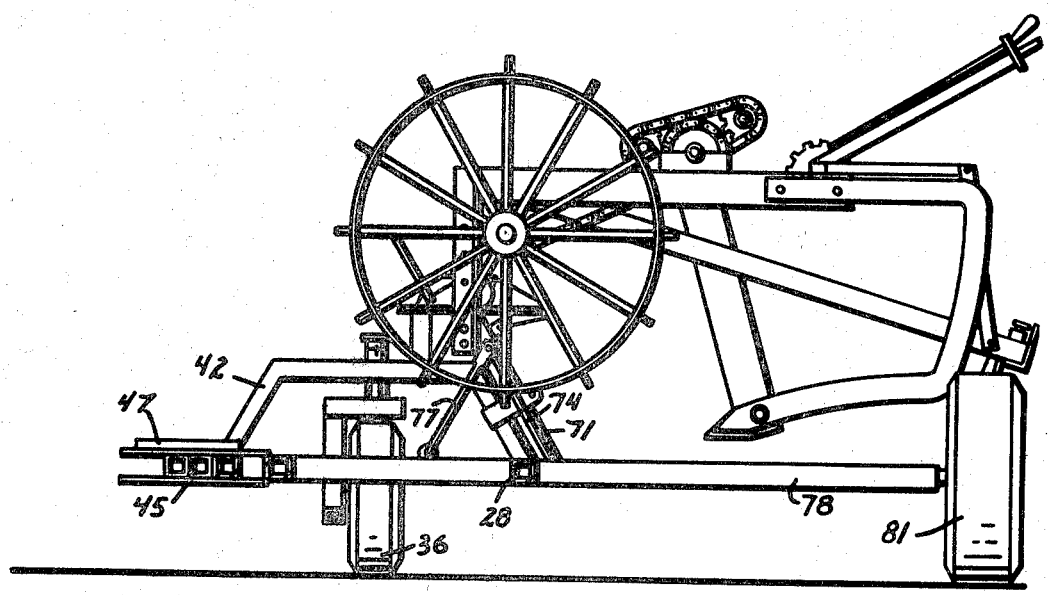
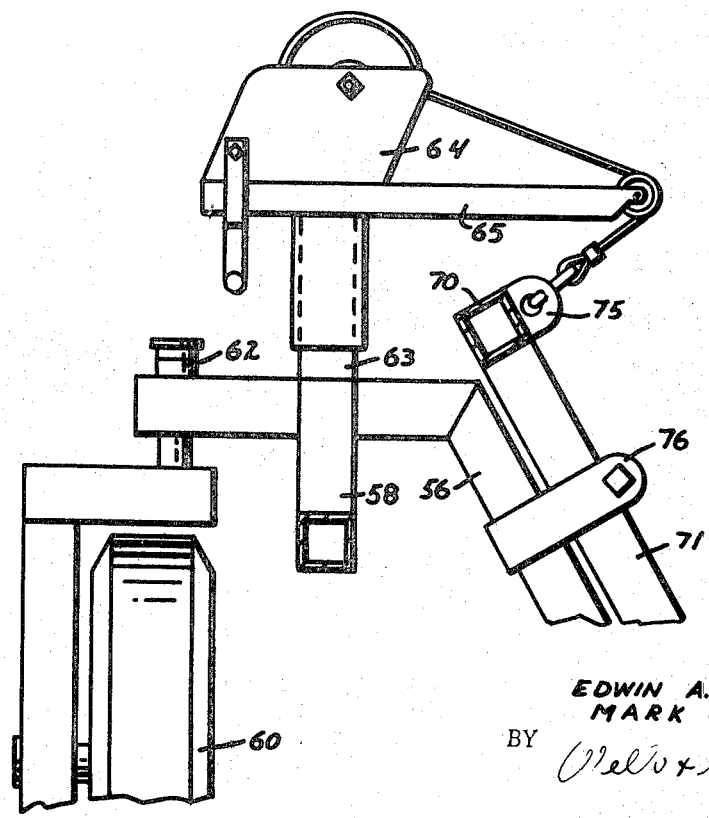

3,532,173

COMBINATION MOBILE HITCH AND HAULER UNIT FOR ROD WEEDERS

BACKGROUND OF THE INVENTION

This invention relates to a mobile hitch and more particularly to a combination mobile hitch and hauler unit for standard rod weeder agriculture implements.

One difficulty that has been encountered with utilizing rod weeders has been to efficiently transport the rod weeders on roads and highways or through gates from one field to another.

The standard rod weeder has a pair of spaced front drive wheels that drive a rotatable horizontal bar that is located beneath and behind the drive wheels. The horizontal bar moves underneath the soil surface and is rotated in the opposite direction to the rotation of the drive wheels for uprooting weeds, etc. Pivotable caster wheels are mounted on the back of the rod weeders to support the rear of the rod weeders. The width of a single standard rod weeder is too wide to be pulled down a highway or through a gate lengthwise. Several modifications of the standard rod weeder have been made to enable the rod weeder to be moved sideways on the highway or through gates from one field to another. An example of such a modification is shown in U.S. Pat. No. 2,696,772 in which an auxiliary transverse wheel is mounted to the front of the rod weeder frame to lift the drive wheels off the ground. The rod weeder is pulled sideways utilizing the transverse wheels and the rear caster wheels.

To efficiently cultivate a large area, several standard rod weeders are generally placed side by side in a row attached to a common hitch or draw bar. The distance from the back of the rod weeders to the front of the hitch is greater than the width of a highway lane and the entire unit cannot be transported sideways down the highway without a special "wide load" permit. This further accents the problem of transporting the rod weeders on the road or through fence gates. To overcome this problem complicated and elaborate single elongated rod weeders have been developed to take the place of four side-by-side standard rod weeders. Such a rod weeder is described in U.S. Pat. No. 3,288,480. The large single rod weeder has wheels that may be turned to the side to enable the elongated rod weeder to be moved sideways for transporting purposes. The rod weeder described in U.S. Pat. No. 3,186,494 is foldable with the outer sections capable of swinging upward to enable the rod weeder to be transported through a fence gate and down a highway.

However the purchase of such a rod weeder is a very expensive proposition for a farmer. Generally he already has four good standard rod weeders in his inventory which represent a substantial capital investment. To purchase a new single rod weeder that may readily be transported on the highway means that the four standard rod weeders will remain idle.

One of the principal objects of this invention is to provide a combination hitch and hauler unit for several side-by-side standard rod weeders that can be utilized to pull the rod weeders across a field to cultivate the field and then contracted to transport the rod weeders sideways through a fence gate or on a road or highway without having to obtain a special "wide load" permit.

An additional object of this invention is to provide a combination hitch and hauler unit for standard rod weeders that is efficient in operation, simple in construction and economical to manufacture.

A further object of this invention is to provide a combination hitch and hauler unit that has individual horizontal draw bars for each rod weeder that are pivotally connected to the main frame to permit the rod weeders to rock with respect to the main frame to enable the rod weeders to maintain ground contact over hilly terrain.

An additional object of this invention is to provide an inexpensive combination hitch and hauler unit that has provisions for readily moving the front end of the rod weeders onto the unit in preparation for transporting. These and other objects of this invention will become apparent upon reading the following description of the preferred embodiment of the invention.

BRIEF DESCRIPTION OF THE DRAWINGS

A preferred embodiment of this invention is illustrated in the accompanying drawings, in which:

FIG. 6 is a fragmentary perspective view of the single T-shaped hitch member shown in the extended or down position and connected to the rod weeder brackets;

FIG. 7 is a fragmentary perspective view of the T-shaped hitch member shown in the up and over center position as viewed in front of the hitch and hauler unit;

FIG. 8 is a fragmentary perspecitve view of the T-shaped hitch member shown in the up and over position as viewed from the back of the rod weeder;

FIG. 9 is a cross-sectional view taken along line 9–9 in FIG. 3 emphasizing the attachable transverse wheel for supporting one side of the unit when the unit is contracted; and FIG. 10 is a fragmentary cross-sectional view taken along line 10–10 in FIG. 3 showing a winch unit for pivoting a hitch member to the up position to lift the front end of a rod weeder off the ground.

DESCRIPTION OF THE PREFERRED EMBODIMENT

Figure 1:
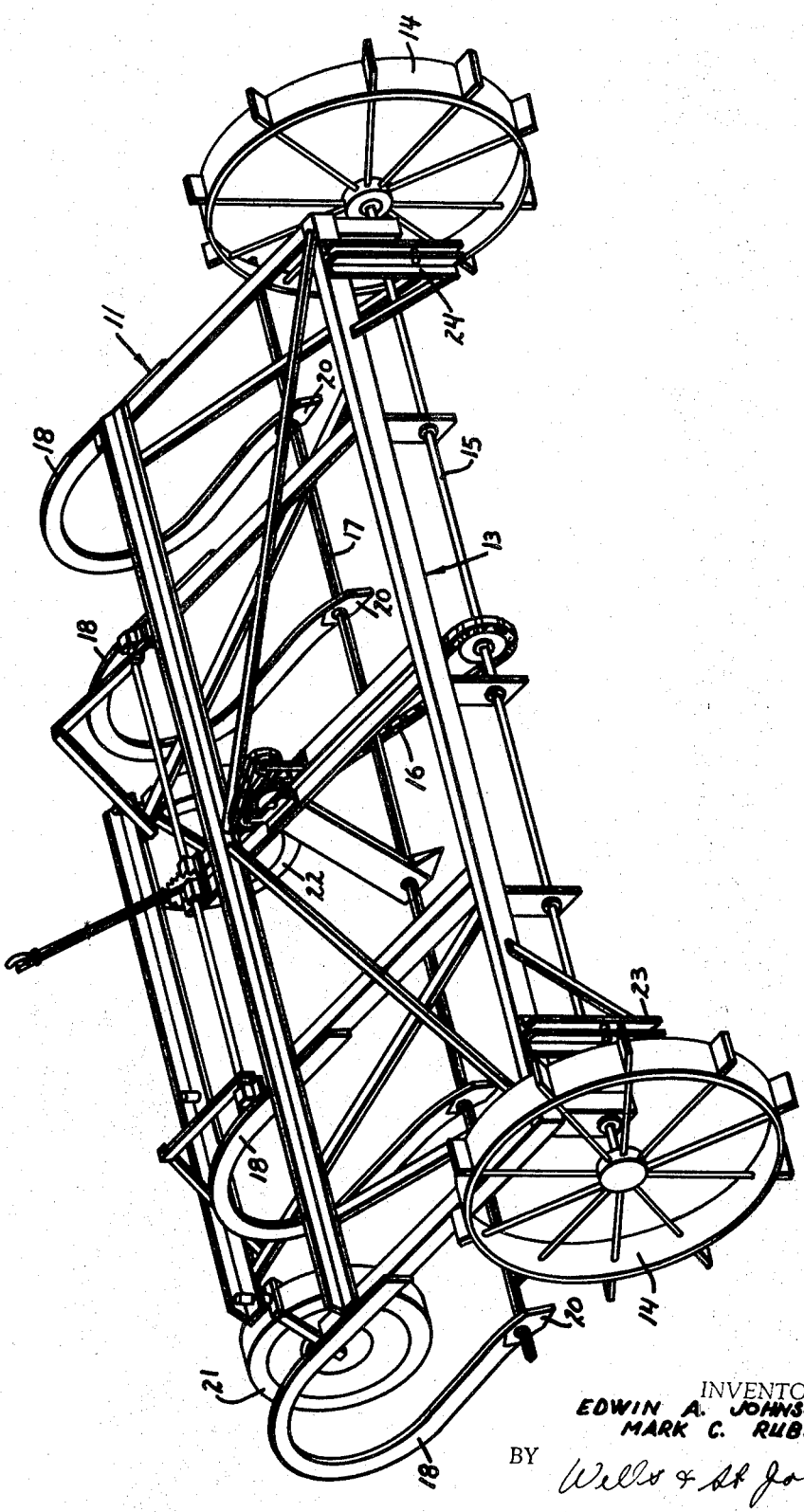
FIG. 1 is a perspective view of a standard rod weeder.

To properly understand the structure and operation of the combination hitch and hauler unit it is helpful to be familiar with the structure and operation of a standard rod weeder as shown in perspective in FIG. 1. Each rod weeder 11 has a frame 13 that is supported in the front by side drive wheels 14. The drive wheels 14 are interconnected by a rotatable axle 15. A drive train 16 is connected to the axle at the center for transmitting the rotation of the axle 15 to a horizontal square rod 17 that is mounted beneath and behind the drive wheels 14. The horizontal square rod 17 is supported in bearings mounted on the ends of gooseneck frame members 18 that initially extend rearwardly and then curve downwardly and forward to the square rod 17. Digging shoes 20 are formed on the forward end of the gooseneck frame members for biasing the square rods 17 into the soil as the rod weeder is pulled along a field. Caster wheels 21 and 22 are mounted at the rear corners of the frame 13 for supporting the rear portion of the rod weeder and for counteracting the torque generated on the frame by the movement of the horizontal square rod 17 beneath the surface of the soil. Spaced towing brackets 23 and 24 are mounted on the front of the frame for attachment to a hitch or a prime mover implement for pulling the rod weeder over the field.

During operation, as the rod weeder moves over the field, the drive wheels rotate the axle 15. The drive train 16 in turn rotates the square rod 17 that is positioned immediately underneath the surface of the soil in a rotational direction opposite to the rotation of the wheels 14 for uprooting weeds and etc., that are in the soil. The rod weeder 11 as shown in the drawings is considered to be a standard rod weeder and has been available in the industry for some 30 to 40 years.

To efficiently cultivate a large area in a minimum amount of time, farmers have placed several rod weeders side-by-side on a wide hitch and pulled the rod weeders across the field in a row.

Figure 2:
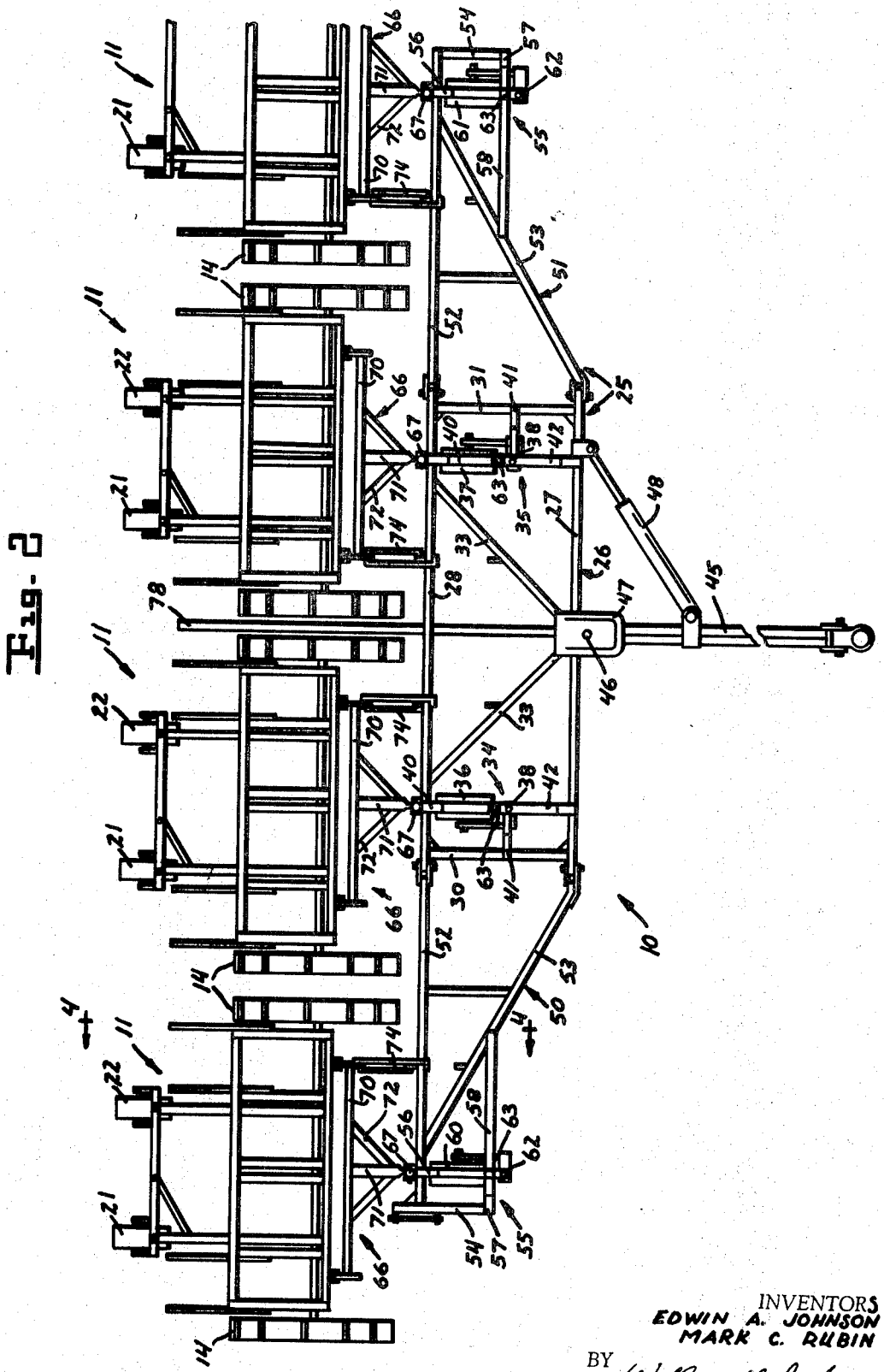
FIG. 2 is a plan view of the combination hitch and hauler unit for standard rod weeders with the rod weeders shown connected immediately behind the unit.
Figure 3:
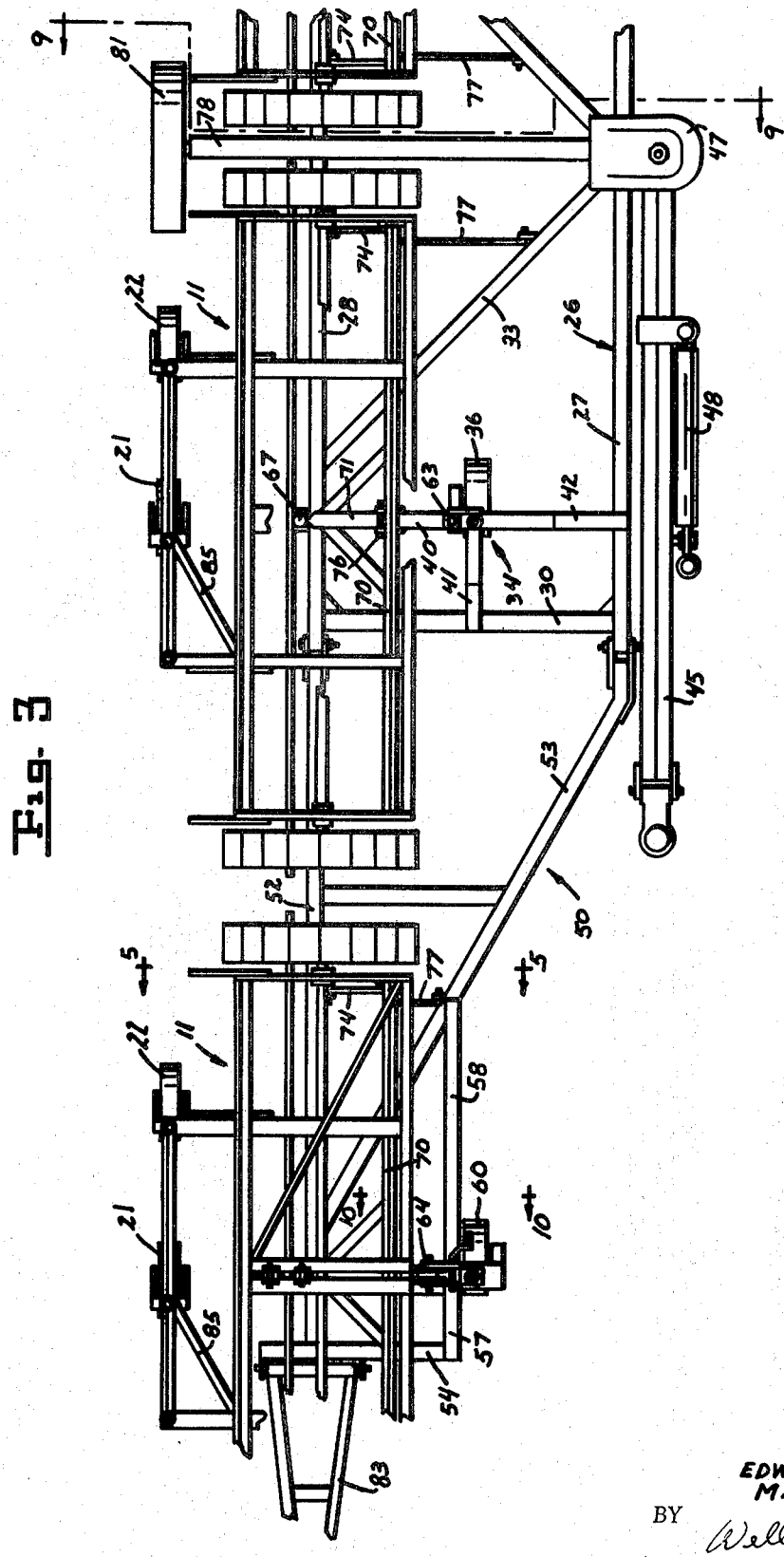
FIG. 3 is a fragmentary enlarged plan view of the unit showing the unit in the contracted position with the front end of the rod weeders on the unit in preparation for transporting the rod weeders.

Referring in detail to FIG. 2 there is shown a combination hitch and hauler unit 10 for pulling and transporting several standard rod weeders 11. The unit 10 as shown in FIG. 2 has four standard rod weeders attached immediately behind the unit. When the unit 10 is in the extended position, it is capable of pulling the side-by-side rod weeders 11 across a field to cultivate the field. When the unit 10 is in the contracted position as shown in FIG. 3 it is capable of transporting the rod weeders through a fence gate from one field to another and on a highway without having to obtain a special "wide load" permit. It should be noted at this point that the distance from the front of the hitch unit 10 and the rear of the rod weeders 11 as shown in FIG. 2 in the extended position, is greater than the width of a lane of the highway and would require a special permit to be able to move the rod weeders and the frame sideways down the highway.

The hitch and hauler unit 10 has a frame 25 that spans the width of the four rod weeders 11. The frame 25 has a central frame section 26 that spans the center two rod weeders. The central frame section 26 is made of tubular frame members having rectangular cross sections. The central frame section 26 has a front frame member 27 that is parallel with the front of the rod weeders. The frame section 26 also includes a rear member 28 that is parallel with the front member 27. The front and rear members 27 and 28 are connected by side members 30 and 31. Cross braces 33 extend diagonally from the front member to the rear member for structural rigidity.

The central frame section 26 has two wheel frames 34 and 35 mounted near the ends of the central frame section for supporting and housing ground engaging caster wheels 36 and 37 respectively. Each of the wheel well frames 34 and 35 has bearings 38 mounted therein for rotatably receiving the caster wheel axles. Each of the wheel well frames 34 and 35 has three brace elements that include knee legs 40, 41 and 42. The knee legs 40 extend from the bearing housing 38 to the rear frame member 28. The knee legs 41 extend to the side members 30 or 31. The knee leg member 42 extends from the bearing housing 38 to the front element 27.

A towing tongue 45 is pivotally connected to the central frame section 26 through a vertical shaft 46 mounted in a bracket 47 extending forward from the central frame section 26. A bracing jack 48 extends from the front frame member 27 to the tongue 46 for facilitating the pulling of the rod weeders across the field at a desired angle.

The unit frame 25 also includes side frame sections 50 and 51 that extend outwardly to the side of the central frame section 26. The side frame sections 50 and 51 are pivotally connected to the central frame section so that they may articulate up and down as the unit is pulled across a field to maintain ground contact with the soil. Each frame section 50 and 51 is a mirror image of the other and each has a rear frame member 52 that is aligned with the rear frame member 28. Each side frame section 50 and 51 has an inclined front frame member 53 that extends from its pivotal connection with the central frame section diagonally rearward to the rear frame member 52. At the outer extremities of the side frame sections 50 and 51 are side frame members 54 that extend perpendicularly forward from the rear member 52. Each of the side frame sections 50 and 51 has a wheel well frame 55 (FIGS. 2, 7 and 8) that includes a knee leg 56 that extends from a bearing housing 62 to the rear channel member 52. A knee leg 57 extends from the bearing 62 to the side member 54. A brace member 58 extends from the bearing 62 to the inclined front frame member 53.

Figure 4:
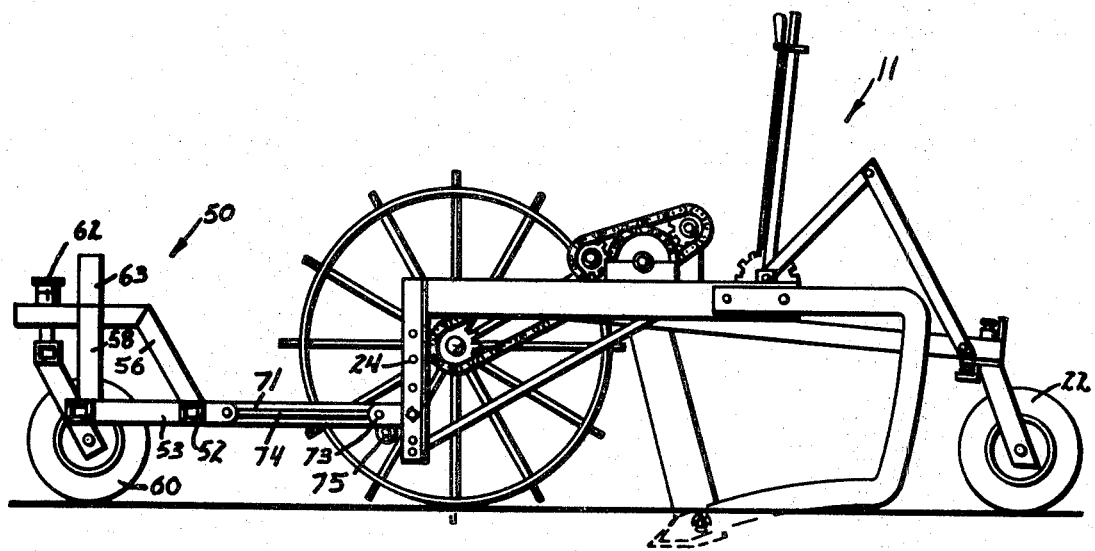
FIG. 4 is a cross-sectional view taken along line 4–4 in FIG. 2 showing the unit in the extended position with the rod weeders connected immediately behind the unit.

The side frame sections 50 and 51 are supported from the ground by ground engaging caster or outrigger wheels 60 and 61 (FIGS. 2, 4 and 5) respectively that are rotatable about the bearing housing 62. Lock screws are provided in the bearing housings 38 and 62 to angularly lock the caster wheels 36, 37, 60 and 61 as desired.

A winch pedestal 63 (FIGS. 2 and 10) is mounted on each of the wheel well frames 34, 35 and 55 for receiving a movable winch 64. The winch 64 may be moved from one winch pedestal 63 to another as desired during the conversion of the unit 10 from a hitch to a hauler. The winch 64 has a forward extending pulley arm 65 (FIG. 10) for facilitating the lifting of the rod weeders onto the unit 10.

Essential elements of the unit 10 are a plurality of T-shaped draw bar frames 66 (FIGS. 2, 6, 7 and 8) pivotally mounted to the rear of the frame 25 for connection with associated rod weeders 11. Each of the T-shaped draw bar frames are pivotally connected to the rear frame members 28 or 52 through a spherical bearing 67 mounted directly behind one of the caster wheels 36, 37, 60 or 61. The T-shaped draw bar frame 66 is capable of rocking from one side or another to enable the connected rod weeder to maintain ground contact at all times independant of the contour of the terrain. The T-shaped draw bar frames 66 may also be pivoted or swung upwardly to lift the front portion of the rod weeders including the drive wheels 14 off the ground and onto the unit 10 (See FIGS. 7 and 8).

Each of the T-shaped draw bar frames 66 includes a horizontal draw bar 70 with a tongue member 71 that perpendicularly connects the bar 70 with a spherical bearing 67. Diagonal side braces 72 extend between the tongue 71 and the horizontal draw bars 70 for structural rigidity. Lugs 73 (FIG. 6) are affixed to the ends of the horizontal draw bar 70 and are pivotally bolted to the towing brackets 23 and 24 of the standard rod weeders 11.

To prevent yaw movement of the rod weeders with respect to the unit 10, tie rods 74 (FIG. 6) are connected between one end of the horizontal draw bar and the frame 25 to hold the horizontal draw bar in substantially transverse parallel relationship with the rear channel members 28 and 52. An eye bracket 75 is mounted to the horizontal draw bar 70 to facilitate the attachment of the winch cable to the draw bar frame to pivot the frame to the over center position.

The knee leg frame members 40 and 56 have an inclined portion that serves as an incline receiving frame for supporting the respective draw bar frame 66 when the draw bar frames are swung upwardly and over center against the respective knee leg section. Securing brackets 76 (FIGS. 4 and 5) are mounted on the knee leg members 40 and 56 for holding the draw bar frames 66 in the up position in which draw bar frames 66 are located at an inclined over center position as shown in FIGS. 3, 7 and 8. This is referred to as the contracted position of the unit 10 in which the distance from the front of the unit 10 to the rear of the rod weeders 11 is less than the width of a highway lane so that it is not necessary to obtain a special "wide load" permit for transporting the rod weeders over the highway. When the draw bar frames are in the up position, tie rods 77 (FIGS. 7 and 8) are connected between one of the lugs 73 and the frame 25 to hold the rod weeder securely on the unit 10.

The frame 26 has a rear extension member 78 (FIGS. 2, 3 and 9) that extends rearwardly from the rear frame member 28 in between the two central rod weeders. When the unit 10 is in the contracted position (FIG. 3) with the front ends of the rod weeders lifted onto the unit 10, an attachable transverse wheel 81 is mounted to the rear frame extension 78. The wheel 81 prevents the hitch unit 10 from collapsing when the tongue 45 is disconnected from the tractor. A side tongue 83 (FIG. 3) is attached to the side frame member 54 and extends outwardly for pulling the hitch and rod weeders sidewards along the highway or through the gate between fields.

During the operation of the unit 10 for pulling the rod weeders across the field to cultivate the soil, the tongue 45 is mounted substantially perpendicular to the frame 25 and is connected to a prime mover for moving the rod weeders in a row across a field. When it is desired to transport the rod weeders to another field or down the highway, the unit 10 is contracted by pivoting the front ends of the rod weeders onto the unit. This is accomplished by mounting the winch 64 on the winch pedestal 63 as shown in FIG. 10. The cable of the winch is attached to the eye bracket 75 on the draw bar frame and moved to swing the draw bar frame upwardly and over center against the knee member 40 or 56 as shown in FIGS. 7, 8 and 10. When the tongue member 71 engages the knee leg member a pin in the securing bracket 76 is positioned to hold the draw bar frame in the up position.

The winch 64 is then moved to the next winch pedestal for lifting the corresponding draw bar frame 66 and corresponding rod weeder onto the frame. This is continued until all of the draw bar frames 66 are in the elevated contracted postion. Before the tongue 45 is disconnected from the prime mover the transverse wheel 81 is connected to the rear frame extension 78. After the wheel 81 is attached the tongue 45 is disconnected from the prime mover and pivoted to a position parallel with the frame 25 as shown in FIG. 3. The side tongue 83 is then connected to the prime mover so the unit 10, and rod weeders 11 may be moved sideways. The caster wheel 61 is locked in the transverse position while the other caster wheels are permitted to freely rotate to maintain steering stability as the unit moves down the road.

Figure 5:
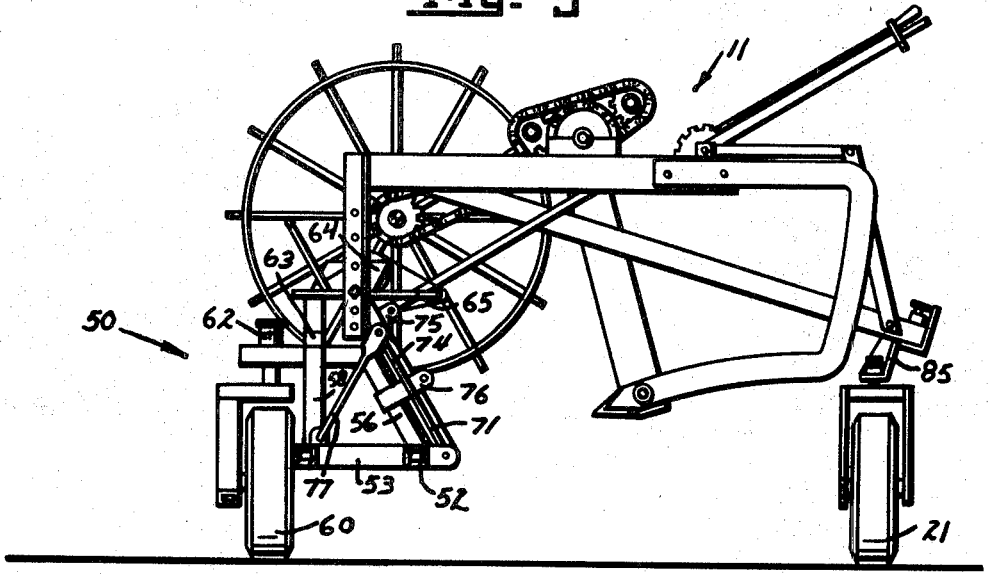
FIG. 5 is a view similar to FIG. 4 except showing the unit in the contracted position with the front ends of the rod weeders on the unit.

As an alternative it may be desirable to elevate the rear end of the rod weeders when they are being transported. This can easily be accomplished by attaching a brace 85 (FIG. 3) at a diagonal to the rod weeder frame and removing the caster wheels 21 from their normal location and mounting them in a housing affixed to the brace 85 as shown in FIGS. 3 and 5.

It should be understood that the above described embodiment is simply illustrative of the principles of this invention. Numerous other embodiments may be constructed incorporating the principles of this invention. Therefore, only the following claims are intended to define this invention.

We claim:

1. In combination with a plurality of rod weeders located side by side, each having:
    a rigid rod weeder frame;
    forward ground engaging wheels on the frame;
    rear ground engaging wheels on the frame;
    a transverse powered weeder rod supported on the frame for elevational movement relative thereto;
    an improvement in a combination mobile hitch and hauler unit for the rod weeders, comprising:
        a transverse hitch frame spanning the plurality of rod weeders;
        ground engaging wheels mounted to said hitch frame;
        individual draw bar frames respectively spanning the individual rod weeder frames, each draw bar frame being pivotal to the hitch frame about a first transverse pivotal axis and being pivoted to the rod weeder spanned thereby about a second pivotal axis spaced from said first pivotal axis;
        each draw bar frame being movable between an extended position projecting rearwardly from its first transverse axis in a direction opposite to the intended direction of movement of the rod weeders in field use, and a contracted position angularly upward and forward of its extended position; and
        means operatively engaged between the hitch frame and the individual draw bar frames for selectively moving the draw bar frames from their extended positions to their contracted positions while connected to the respective rod weeder frames to thereby raise the front end of the rod weeder frame relative to the rear ground engaging wheels, said rear ground engaging wheels remaining in ground contact when the draw bar frame is in its contracted position.

2. The apparatus as set out in claim 1 wherein said last-named means pivots the draw bar frames over center with respect to said first transverse pivotal axes; and
    a fixed support mounted to the hitch frame in longitudinal alignment with each draw bar, said supports having rearwardly facing surfaces thereon located forwardly and upwardly of the respective first transverse pivotal axes and within the path of movement of the draw bar frames about said first transverse pivotal axes.

3. The apparatus as set out in claim 1 wherein said last-named means pivots the draw bar frames over center with respect to said first transverse pivotal axes; and
    a fixed support mounted to the hitch frame in longitudinal alignment with each draw bar, said supports having rearwardly facing surfaces thereon located forwardly and upwardly of the respective first transverse pivotal axes and within the path of movement of the draw bar frames about said first transverse pivotal axes; and
    locking means for securing each of the draw bar frames to the support aligned therewith.

4. The apparatus set out in claim 1, further comprising a spherical bearing mounted to the front end of each draw bar when in its extended position and located at the transverse center thereof, said spherical bearing being also mounted to the hitch frame and being operative to pivotally support the draw bar frame relative to the hitch frame about said first transverse pivotal axis.

5. The apparatus set out in claim 1, further comprising:
    a spherical bearing mounted to the front end of each draw bar when in its extended position and located at the transverse center thereof, said spherical bearing being also mounted to the hitch frame and being operative to pivotally support the draw bar frame relative to the hitch frame about said first transverse pivotal axis; and
    fixed supports mounted to said hitch frame in the path of movement of each draw bar frame about its first transverse pivotal axis, each support having an outer surface above and forward of the first pivotal axis adapted to be abutted by the draw bar frame when pivoted to its contracted position by said last-named means.

6. The apparatus set out in claim 1, further comprising:
    a spherical bearing mounted to the front end of each draw bar when in its extended position and located at the transverse center thereof, said spherical bearing being also mounted to the hitch frame and being operative to pivotally support the draw bar frame relative to the hitch frame about said first transverse pivotal axis;
    fixed supports mounted to said hitch frame in the path of movement of each draw bar frame about its first transverse pivotal axis, each support having an outer surface above and forward of the first pivotal axis adapted to be abutted by the draw bar frame when pivoted to its contracted position by said last-named means; and
    locking means engageable between each draw bar frame and the support aligned therewith for fixing the position of the draw bar frame in abutment with the outer surface of the respective support.